US008016069B2

(12) United States Patent  (10) Patent No.: US 8,016,069 B2
Chisholm et al.  (45) Date of Patent: Sep. 13, 2011

(54) CONTROL SYSTEM AND METHOD FOR OPERATING A HYDROSTATICALLY DRIVEN VEHICLE

(75) Inventors: Matthew Chisholm, Minneapolis, MN (US); Stephen Nelson, Andover, MN (US); Steven D. Lundquist, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/940,074

(22) Filed: Nov. 5, 2010

(65) Prior Publication Data

US 2011/0054746 A1  Mar. 3, 2011

Related U.S. Application Data (62) Division of application No. 11/947,461, filed on Nov. 29, 2007, now Pat. No. 7,849,953.

(51) Int. Cl.
*B60K 17/14* (2006.01)
(52) U.S. Cl. ........................ 180/307; 180/308
(58) Field of Classification Search .................. 180/305, 180/306, 307, 308
See application file for complete search history.

(56) References Cited

U.S. PATENT DOCUMENTS

| 4,139,987 A | 2/1979 | Budzich |
| 4,208,895 A | 6/1980 | Grigorenko et al. |
| 4,240,515 A | 12/1980 | Kirkwood |
| 4,644,748 A | 2/1987 | Goss, Jr. et al. |
| 4,655,689 A | 4/1987 | Westveer et al. |
| 5,474,147 A | 12/1995 | Yesel et al. |
| 5,481,875 A | 1/1996 | Takamura et al. |
| 5,495,912 A * | 3/1996 | Gray et al. ................ 180/165 |
| 6,347,517 B1 | 2/2002 | Sereni |
| 6,922,990 B2 | 8/2005 | Naruse et al. |
| 7,100,723 B2 * | 9/2006 | Roethler et al. .......... 180/165 |
| 7,540,825 B2 * | 6/2009 | Hofer ......................... 477/196 |
| 7,628,240 B2 * | 12/2009 | Caldwell ................... 180/242 |
| 2006/0108475 A1 | 5/2006 | Bartov |
| 2006/0191732 A1* | 8/2006 | Lunzman et al. .......... 180/307 |

* cited by examiner

*Primary Examiner* — John R Olszewski
(74) *Attorney, Agent, or Firm* — Leydig, Voit & Mayer (57) ABSTRACT

A hydrostatically powered vehicle includes an engine operatively associated with a pump that supplies fluid to a propel motor. Based on various sensed and engine operating conditions, a controller determines a desired operating condition for the engine while maintaining the travel speed of the vehicle constant.

6 Claims, 5 Drawing Sheets

CONTROL SYSTEM AND METHOD FOR OPERATING A HYDROSTATICALLY DRIVEN VEHICLE

CROSS-REFERENCE TO RELATED APPLICATIONS

This patent application is a Divisional of U.S. patent application Ser. No. 11/947,461, filed Nov. 29, 2007, the subject matter of which is incorporated herein by reference.

TECHNICAL FIELD

This patent disclosure relates generally to hydrostatically driven vehicles and, more particularly, to methods of controlling engines associated with such vehicles.

BACKGROUND

Hydrostatically driven vehicles are known. A typical vehicle includes an engine having an output shaft connected to one or more fluid pumps. The typical fluid pump is connected to the engine through a transmission and includes the capability of varying its displacement to accommodate power demands of the vehicle. The fluid pump or pumps associated with the vehicle is connected via fluid pressure lines to various actuators and hydraulic motors around the vehicle. For example, a vehicle may have one or more hydraulic propel motors that rotate the drive wheels or rollers and move the vehicle over the terrain. These motors are powered by a pressurized flow of fluid from the pump. The speed and torque output of these motors is proportional to the flow rate of the hydraulic fluid passing through them.

An engine on a hydrostatically driven vehicle often is configured to operate in a continuous fashion at a constant speed and torque output. For this reason, the modulation of the flow rate of hydraulic fluid supplied to the various systems of the vehicle is accomplished through control of the displacement of the pump. The vehicle operator moves a control lever to effect adjustment of the pump displacement. The control lever is connected via a cable connection to a mechanism used to change and adjust the displacement of the pump. For example, a known variable displacement pump having reciprocating pistons whose stroke can be controlled by the angle of a rotating swash-plate may have the cable operatively arranged to change the angle of the swash-plate in response to a change in position of the control lever by the operator.

While this mode of control for hydrostatic vehicles is effective, operation of the engine at this constant condition does not provide fuel economy, reduced noise, or longevity of service for the vehicle. That is, operation of the vehicle's engine at a constant engine speed and torque capability becomes wasteful when the vehicle is not operating at full load capacity.

SUMMARY

The disclosure describes, in one aspect, a method of operating a hydrostatically powered vehicle that includes an engine operatively associated with a fluid pump. The fluid pump is capable of supplying a flow of fluid through at least one hydrostatic propel motor to propel the vehicle at a travel speed. The engine is responsive to at least one set of operating conditions that are commanded by an electronic control module. During operation of the vehicle, the engine may operate at a first operating condition. A control is set by an operator to a desired fluid flow rate corresponding to a first displacement setting of the pump and the vehicle is propelled at a travel speed by passing the flow of fluid through the propel motor. The travel speed is proportional to the flow rate of fluid passing through the propel motor. The pressure of the flow of fluid is sensed with a sensor and relayed to the electronic controller. A second operating condition for the engine is determined by the electronic controller based on the pressure of the flow of fluid, the displacement setting of the pump, and at least one parameter of the first operating condition. The engine is then operated at the second operating condition while maintaining the travel speed constant. The second operating condition has improved fuel economy and reduced noise as compared to the first operating condition.

In another aspect, the disclosure describes a control system that includes a control connected to the variable displacement pump and operative to set a desired flow rate of the flow of fluid. A displacement sensor connected to the variable displacement pump senses a displacement setting of the variable displacement pump and a pressure sensor senses the pressure of the fluid operating the propel motor. The electronic controller receives the desired flow rate of the flow of fluid, the displacement setting from the displacement sensor and the pressure of fluid, and determines a pump load factor based on the displacement setting and the pressure. An engine operating parameter is calculated based on the determined pump load factor and the desired flow rate against a map of engine operating parameters. At least one of the fueling command of the engine, the displacement setting of the pump, and a displacement setting of the propel motor is/are changed to improve the operation and efficiency of the vehicle.

DETAILED DESCRIPTION

This disclosure relates to methods and processes for optimizing the operation of hydrostatically driven vehicles in as much fuel consumption and noise are reduced while the service life and maintenance intervals are increased. A pressure of the hydraulic system is sensed and relayed to an electronic controller executing an optimization algorithm that adjusts various engine and hydraulic system parameters such that the engine can operate in a more efficient state while providing adequate power to meet vehicle demands. For example, the engine can operate at a lower engine speed and torque output when the demand of the vehicle is less than maximum. More specifically, when the controller determines that the power output of the engine exceeds the power consumption of the system, the controller can provide appropriate output signals to adjust the operating condition of the engine to achieve improved fuel economy. In some embodiments, the controller can also reduce the engine speed of the operating engine while compensating with an increase in displacement of the pump or propel motors, such that flow rate of the system is maintained constant while the fuel economy and service life of the vehicle are improved.

Figure 1:
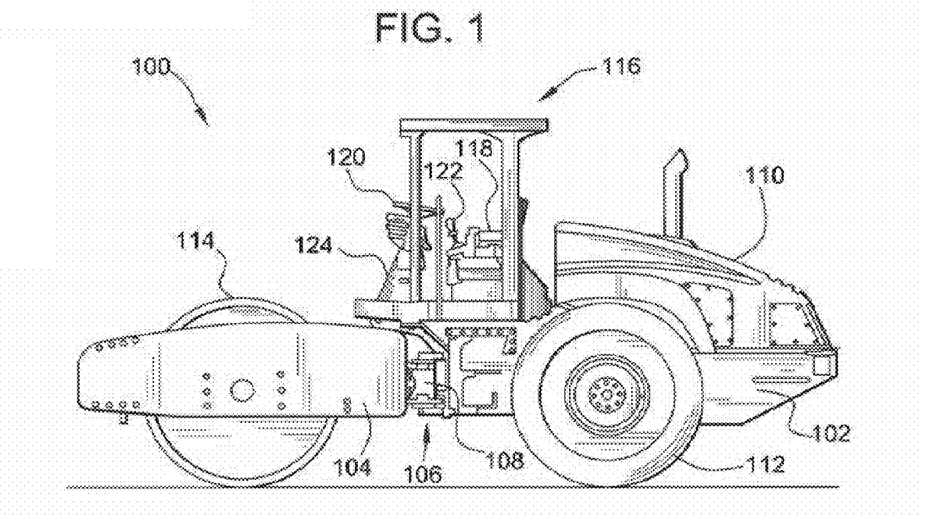
FIG. 1 is an outline view of one example of a hydrostatically driven vehicle in accordance with the disclosure.

An outline view of one example of a hydrostatically driven vehicle 100 is shown in FIG. 1. The vehicle 100 is a soil compactor vehicle that is used for illustration purposes only. As will be appreciated, this disclosure applies to any application of a hydrostatic drive arrangement in other types of vehicles.

The vehicle 100 includes an engine frame portion 102 and a non-engine frame portion 104. The two portions of the frame 102 and 104 are connected by an articulated joint 106 that includes a hinge 108, which allows the vehicle 100 to steer during operation. The engine rame portion 102 of the frame includes an engine 110 and a set of wheels 112 (only one wheel visible). The engine 110 can be an internal combustion engine, for example, a compression ignition engine, but in general, the engine 110 can be any prime mover that provides power to various systems of the vehicle by consuming fuel.

In the exemplary vehicle 100 presented herein, the non-engine frame portion 104 accommodates a drum 114 that rotates about a centerline thereof while the vehicle 100 is in motion. The drum 114, which may include an internal vibrator mechanism (not shown), acts to compact the terrain beneath the vehicle 100. The vehicle 100 is typically operated by an operator occupying a cab 116. The cab 116 may include a seat 118, a steering mechanism 120, a speed-throttle or control lever 122, and a console 124. An operator occupying the cab 116 can control the various functions and motion of the vehicle 100 by, for example, using the steering mechanism 120 to set a direction of travel for the vehicle 100, or using the control lever 122 to set the travel speed of the vehicle. As can be appreciated, the representations of the various control mechanisms presented herein are generic and are meant to encompass all possible mechanisms or devices used to convey an operator's commands to a vehicle.

Figure 2:
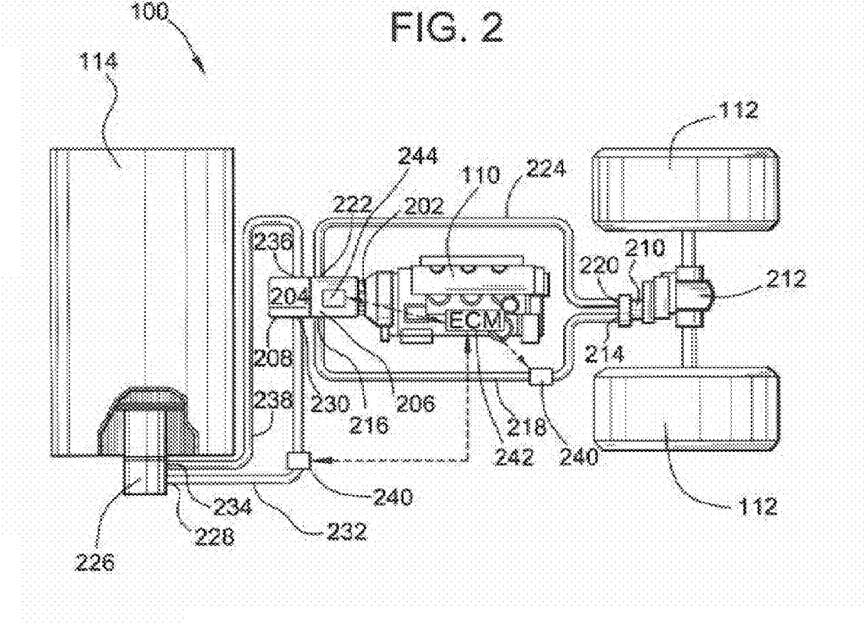
FIG. 2 is a block diagram of various components and systems of the vehicle shown in FIG. 1.

A block diagram of various components and systems of the vehicle 100 is shown in FIG. 2. The engine 110 may be connected via a transmission 202 to two variable displacement pumps, shown generally as 204. A first variable displacement pump 206 may be connected to a second variable displacement pump 208 along their respective input drive shafts (not shown). The two pumps 204 are connected to the transmission 202 such that both pumps 204 are driven together by the engine 110. As can be appreciated, a single pump may be used in place of the two pumps 204 or, alternatively, more than two pumps may be used in tandem or in any other appropriate arrangement.

The first variable displacement pump 206 may be connected to a first propel motor 210. The propel motor 210 may be a hydrostatic drive motor operating to turn a differential 212 that drives the wheels 112. The first propel motor 210 has a fluid input 214 connected to a fluid output 216 of the first pump 206 via a rear propel circuit fluid supply line 218. A fluid output or return 220 of the first propel motor 210 is connected to a fluid return port 222 of the first pump 206 via a rear propel circuit fluid return line 224. The fluid return line 224 may be connected directly to an appropriate port of the first pump 206 or may, alternatively, be connected directly to a fluid reservoir (not shown) that stores and supplies the first pump 206 with fluid. In a similar fashion, the second pump 208 may be connected to a drum propel motor 226. The propel motor 226 may operate to turn the drum 114 and have a fluid input 228 connected to a fluid output 230 of the second pump 208 via a front propel circuit fluid supply line 232. Similarly, a fluid output or return 234 of the propel motor 226 is connected to a fluid return port 236 of the second pump 208 via a front propel circuit fluid return line 238.

Pressure sensors 240 are connected, at least one each, onto the front and rear fluid supply lines 218 and 232. As can be appreciated, more than one sensor 240 can be connected onto each line or, alternatively, one sensor may be used on one of the supply lines 218 and 232 but not the other. In the exemplary embodiment shown, two sensors 240 are arranged to individually sense the pressure of fluid passing through each of the rear fluid supply line 218 and the front fluid supply line 232. Each of the sensors 240 is connected, and provides pressure sensing signals, to an electronic control module (ECM) 242. The ECM 242 can be mounted onto any location on the vehicle or engine, and may be connected to the sensors and other components of the vehicle 100 and/or the engine 110 in any known fashion. For example, the ECM 242 may be connected via wires carrying a voltage or current that is proportional to the pressure sensed by the sensors 240, or wires and other conduits that carry digital information within a closed area network (CAN) link between the ECM 242 and the sensors 240. The ECM 242 can further be connected to a displacement sensor 244 that measures the displacement of the first pump 206, or the second pump 208, or both pumps simultaneously. A single displacement sensor 244 is shown for the sake of simplicity, but more than one sensor(s) may be used to sense a displacement of one or both pumps 206 and 208. In any event, the displacement sensor 244 operates to provide a displacement sensing signal to the ECM 242.

Figure 3:
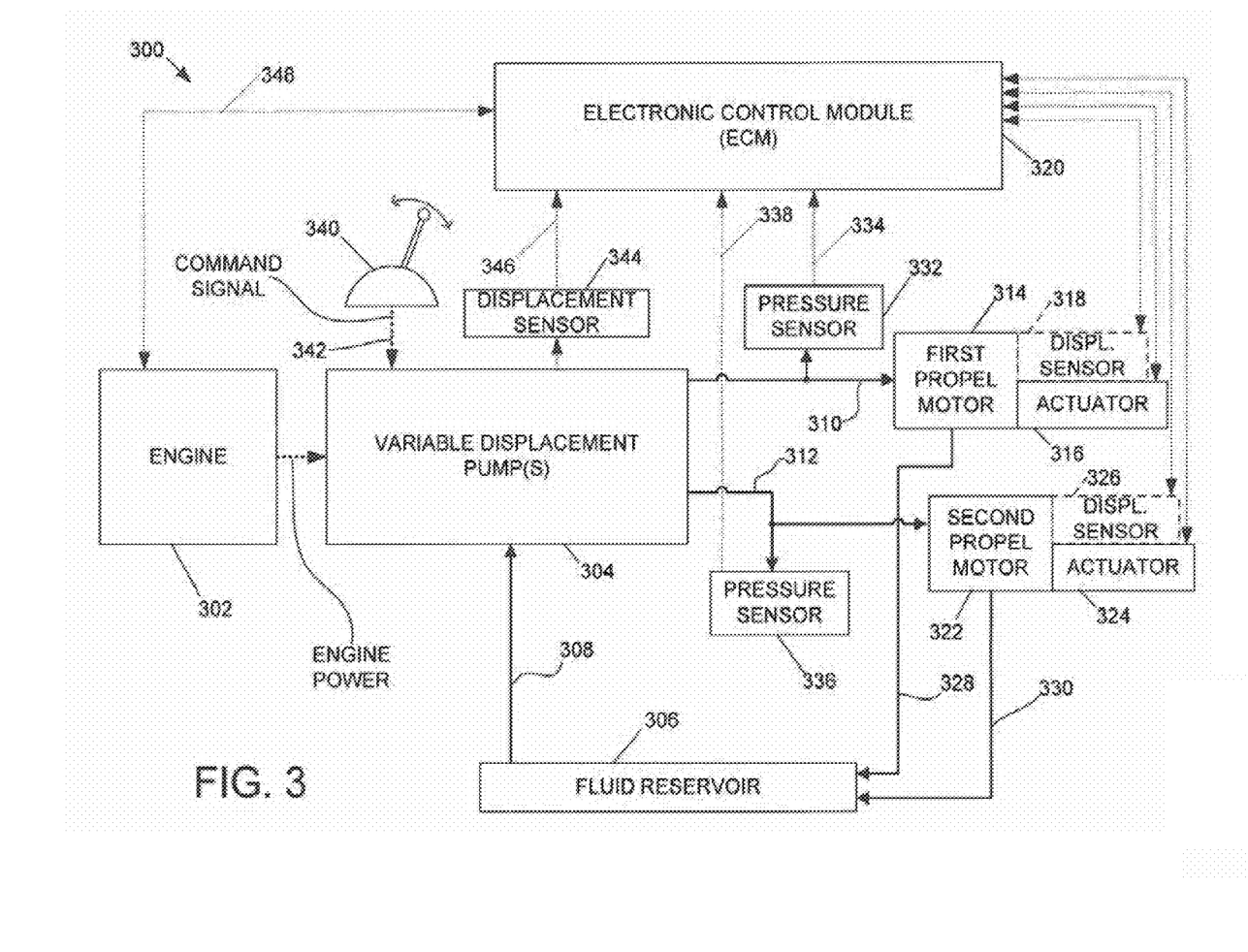
FIG. 3 is a functional diagram of a first embodiment for a hydraulic system in accordance with the disclosure.

A functional diagram of a first embodiment for a hydraulic system 300 in accordance with the disclosure is shown in FIG. 3. The system 300 includes an engine 302 operably connected to one or more variable displacement fluid pump(s) or pumping system 304. All connection paths transferring fluid in this illustration are denoted by solid lines, and all connection paths for power and/or information between components are denoted by dotted lines. Dashed lines are used to denote optional components. During operation of the system 300, engine power (denoted by dotted line) is generated by the engine 302 and transferred to the pumping system 304. The pumping system 304 is arranged to receive engine power and use it to pump a flow of hydraulic fluid from a reservoir 306 through an inlet line 308. The pumping system 304 pumps the flow of fluid out of one or more outlet passages, in this case, a first propel passage 310 and a second propel passage 312. The flow of fluid in the first propel passage 310 is routed to a first propel motor 314. As described, the first propel motor 314 may be a hydrostatic propel motor operating to rotate one or more wheels or a drum of the vehicle. The first propel motor 314 advantageously has the capability of variable displacement. A displacement of the first propel motor 314 may be controlled by an actuator 316. An optional position or displacement sensor 318, shown in dashed line, may be connected to the first propel motor 314 and/or the actuator 316 associated therewith, and may be arranged to sense and relay information relative to the displacement state of the first motor 314 to the ECM 320 in an appropriate fashion, as previously described. The actuator 316 of the first propel motor 314 is appropriately connected to the ECM 320, is configured for receiving relay positional commands from the ECM 320, and operates to change a displacement state of the first propel motor 314.

In a similar fashion, a second propel motor 322 is capable of variable displacement. The displacement of the second propel motor 322 may be controlled by an actuator 324. An optional position or displacement sensor 326, also shown in dashed line, may be connected to the second propel motor 322 and/or the actuator 324, and be arranged to sense and relay information relative to the displacement state of the second motor 322 to the ECM 320. The actuator 324 of the second propel motor 322 is configured for receiving relay positional commands from the ECM 320 and operates to change a displacement state of the second propel motor 322.

The first and second propel motors 314 and 322 receive a flow of fluid during operation, respectively, through the first propel passage 310 and the second propel passage 312. The flow of fluid may be returned to the pump system 304 or, as shown in this embodiment, be returned to the fluid reservoir 306 through, respectively, a first return passage 328 and a second return passage 330. Fluid in the first propel passage 310 and the second propel passage 312 may be at a high pressure to drive the motors 314 and 322, while fluid in the first return passage 328 and the second return passage 330 may be at a low or atmospheric pressure.

A first pressure sensor 332 may be in fluid communication with the first propel passage 310. The first pressure sensor 332 may be arranged to measure the pressure of the fluid flow supplied to the first propel motor 314. The first pressure sensor 332 may output an analog or digital electrical signal that is proportional to the pressure of the fluid being sensed. This signal or reading is then relayed to the ECM 320 through a communication line 334, shown in dotted line. Similarly, a second pressure sensor 336 may be in fluid communication with the second propel passage 312. The second pressure sensor 336 may be arranged to measure the pressure of the fluid flow supplied to the second propel motor 322 and may output an analog or digital electrical signal that is proportional to the pressure of the fluid being sensed. This signal or reading is also relayed to the ECM 320 through a communication line 338, shown in dotted line. As can be appreciated, fewer or more than two pressures may be used either in the system shown or in other systems having fewer or more propel motors associated therewith.

While the system 300 operates, an operator can adjust the flow rate of fluid being pumped by the pump system 304. For example, in the case when the first and second propel motors 314 and 322 are operatively connected to wheels or rollers of a vehicle, the flow rate of fluid passing through the first and second propel motors 314 and 322 determines the speed of travel for the vehicle. As is known, the output speed of a hydrostatic propel motor increases as the flow rate of fluid passing therethrough is increased. A control lever 340 is connected to a displacement mechanism (not shown) of the pump or pumps 304 via a linkage 342. The linkage 342 allows for the communication of any manual displacement or control signal generated by displacement of the control lever 340 to be communicated to the pump system 304. Changes in displacement of the control lever 340 may cause corresponding changes in displacement within the pump system 304, thus causing changes in the flow of fluid passing through the first and second propel motors 314 and 322 to, ultimately, cause changes in the travel speed of the vehicle.

A displacement sensor 344 is appropriately connected to the pump system 304 and arranged to sense a displacement condition or state of the pump system 304. The displacement sensor is capable of generating a displacement signal that may be transferred in the form of an analog or digital signal indicative of the operating condition of the pump system 304 to the ECM 320 via an appropriate communication line 346. The ECM 320 is also capable of receiving information from and sending commands to various components of the engine 302 through a suitable communication pathway, shown generally at 348. For example, engine information may include various engine parameters, such as engine speed and engine load or torque output.

Figure 4:
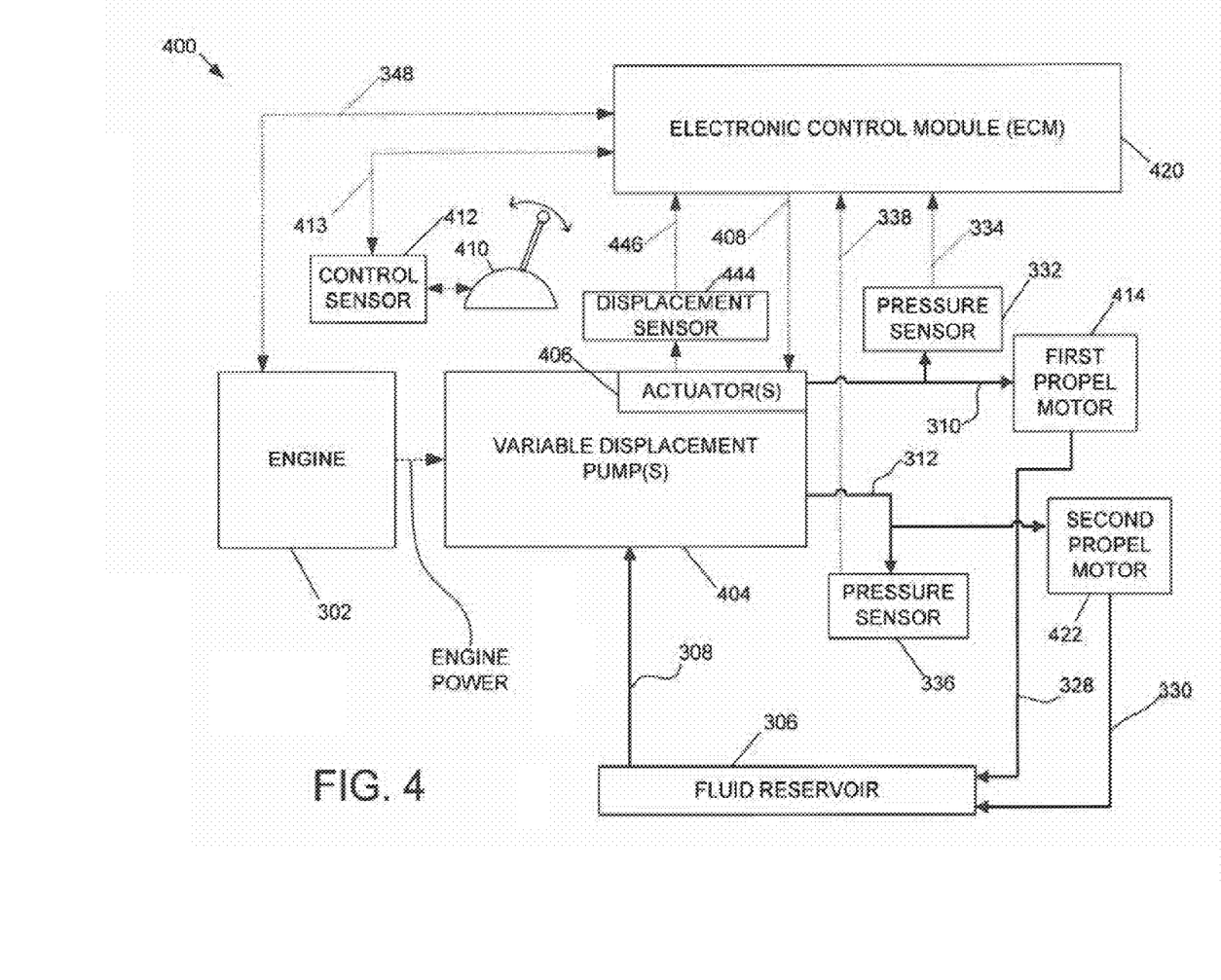
FIG. 4 is a functional diagram of a second embodiment for a hydraulic system in accordance with the disclosure.

A functional diagram of a second embodiment for a hydraulic system 400 in accordance with the disclosure is shown in FIG. 4. In this embodiment, like components are denoted with like reference numerals as previously used to describe components of the first embodiment for the sake of brevity and simplicity. The system 400 includes the engine 302 operably connected to one or more variable displacement fluid pump(s) or, in general, a pumping system 404. The pumping system 404 has a variable displacement capability that is controlled by an actuator or actuators 406. Unlike the pumping system 304 of the first embodiment, control of the displacement of the pumping system 404 is accomplished electronically through action of the actuator(s) 406. A communication link 408 connects an ECM 420 with the actuator(s) 406 such that displacement commands can be relayed to the actuator(s) 406, which in response will act to change the displacement position of the pumping system 404 and, therefore, change the flow rate of fluid and the travel speed of the vehicle. Stated differently, the system 400 of the second embodiment is configured for "fly by wire" control of the vehicle speed by the operator.

Here, a control lever 410 is connected to a control sensor 412. Displacement of the control lever 410 is sensed by the control sensor 412, which sends an electrical signal indicative of the position of the control lever 410 to the ECM 420 via a control communication line 413. The signal from the control sensor 412 may be any type of appropriate signal known, for example, an analog or digital signal received and interpreted by the ECM 420. Control of the displacement position of the pump system 404 by the ECM 420 may be in the form of a closed loop control scheme. A closed loop control scheme uses feedback from a sensor connected to the system being controlled to gage the amount of control needed to achieve a desired position. In this case, a displacement sensor 444 connected to the pumping system 404 is arranged to sense the displacement position of the system 404 and relay this information back to the ECM 420 through a displacement feedback line 446.

During operation of the system 400, the pump system pumps a flow of fluid to a first propel motor 414 and to a second propel motor 422. Unlike the first and second propel motors 314 and 322 of the first embodiment, the first and second propel motors 414 and 422 have a fixed displacement. Here, a variable displacement capability in the motors 414 and 422 might be beneficial to finer control of the travel speed in some situations and is considered optional. The second embodiment has the first pressure sensor 332 and second pressure sensor 336 arranged to sense the pressure of fluid in the first propel passage 310 and the second propel passage 312 respectively.

While the system 400 is in operation, an operator can adjust the flow rate of fluid being pumped by the pump system 404 by moving the control lever 410. The displacement is sensed by the control sensor 412 and relayed to the ECM 420 where it is interpreted as a desired speed. The desired speed is translated into a desired position for the displacement of the pump system 404 and a command is sent to the actuator(s) 406 to effect the change. The displacement sensor 444 provides the feedback to the ECM 420 that is required to appropriately command the actuator(s) 406 such that the desired displacement of the pump system 404 is achieved. After the desired displacement has been achieved, a desired flow rate flowing to the first and second propel motors 414 and 422 causes the vehicle to travel at the desired speed.

Figure 5:
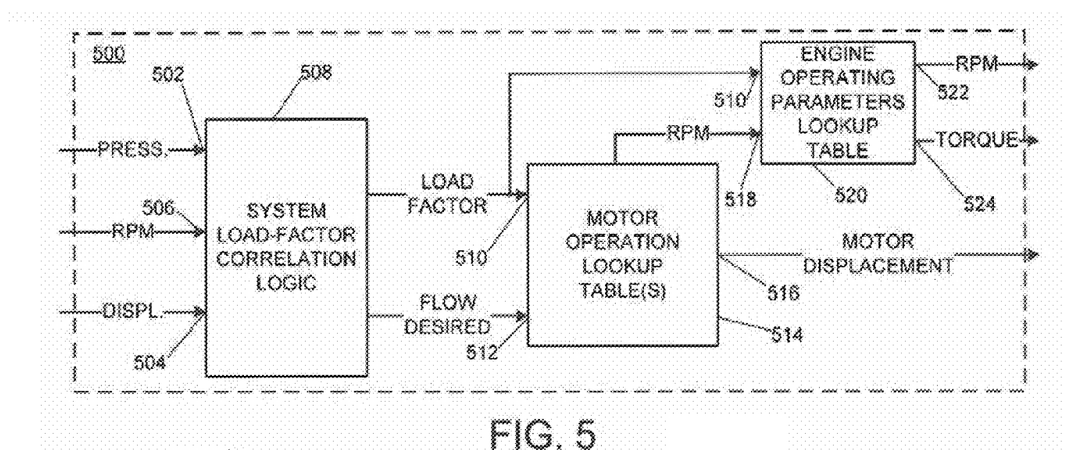
FIG. 5 is a functional diagram of at least a portion of the logic included in the electronic control module of the first embodiment.

A functional diagram of at least a portion of the logic included in the ECM 320, which was described in the context of the first embodiment of FIG. 3, is shown in FIG. 5. A logic module 500 receives inputs relating to the operation of various engine and hydraulic system components. A first input node 502 is arranged to receive a pressure signal or value. The pressure value present at the first node 502 can be an indication of the pressure of fluid present in the first and/or the second propel circuit(s) 310 and 312, discussed above in the context of the first embodiment.

A second input node 504 is arranged to receive a displacement signal or value. The displacement value present at the second node 504 can be an indication of the displacement state of the pump system 304 discussed in the presentation of the system 300 of the first embodiment. A third input node 506 is arranged to receive an engine speed or revolutions per minute (RPM) of the engine 302. The RPM value may be one of the various parameters that are relayed to the ECM 320 via the communication pathway 348.

The values from the first, second, and third input nodes 502, 504, and 506, enter a system load-factor correlation function 508. This correlation function 508 may contain various parameters that calculate, based on preset equations of the system, or interpolate, based on predetermined data arrays (not shown), the load-factor of the system at any given time. The load-factor may be a non-dimensional parameter that is indicative of the percentage of energy used by the vehicle of the total energy input to the system from the engine. Alternatively, the load factor may be the work consumed by the system that is measured in units of work, power, or torque. Therefore, on the one hand the load factor may tend to increase as the energy input to the system from the engine increases, as indicated by the RPM of the engine. On the other hand, the load factor may tend to decrease as the energy input to the system decreases, and as the energy consumed by the system decreases, as indicated by the pressure and currently displacement of the pump. Based on the foregoing, it can be appreciated that the load factor is proportional to the RPM of the engine, proportional to the pressure sensed, and inversely proportional to the displacement of the pump system. Hence, in instances when the vehicle is moving at a slow speed but the engine operates at high RPM, the load factor will be high because the flow of fluid to the propel motors will be low, the displacement of the pump system will be low, but the pressure will likely be high.

The correlation function 508 may also be capable of deducing the desired travel speed of the vehicle, as expressed by a desired flow of fluid from the pump. The desired flow of fluid from the pump may be calculated by the combination of RPM of the engine with the displacement of the pump. As is known, the flow of fluid from the pump may be calculated if the rate of rotation of the pump and the displacement state of the pump are known. Based on these calculations, the load factor is output from the correlation function 508 at a fourth node 510, and the desired flow rate of fluid is output at a fifth node 512.

A motor operation lookup table function 514 receives the load factor from the fourth node 510 and the flow desired from the fifth node 512. The motor operation function 514 may contain two- or three-dimensional arrays of data that correlate load factors against desired flow rates and yield different combinations of system parameters capable of producing acceptable system performance with minimum waste. More specifically, the motor operation function 514 may contain different combinations of engine RPM values with motor displacement values that will both yield the desired fluid flow rate to the propel motors of the system, but will also feature reduced pressures within the system, and even be capable of operating the engine economically and at a lower RPM. As a result of the calculations or interpolations within the motor control function 514, an output at a sixth node 516 may be a new displacement command for each of the first and second propel motors that can, as described above, operate to change the displacement of the first and second propel motors. A second output at a seventh node 518 can be a RPM value that optimizes operation of the engine under the given conditions.

Figure 6:
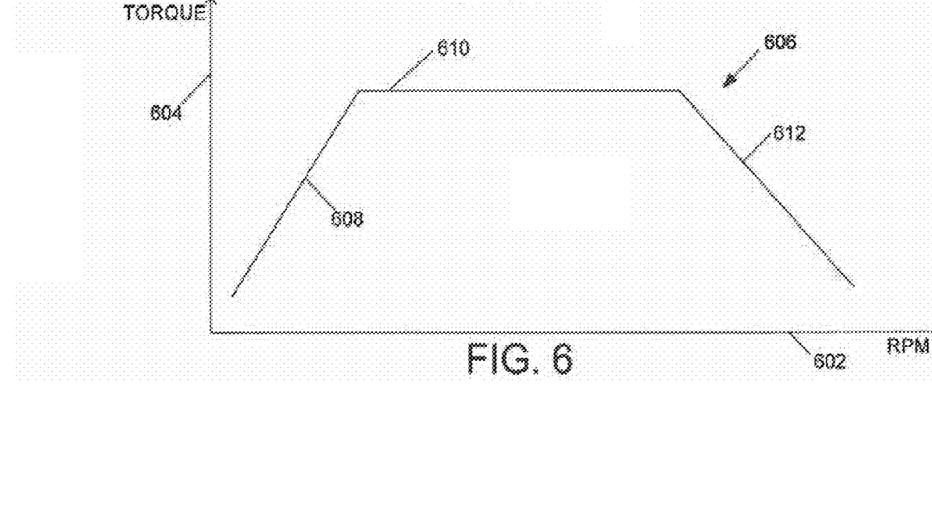
FIG. 6 is an example of a generic power curve for an engine.

The load factor value at the fourth node 510, along with the RPM value at the seventh node 518, may be relayed to a lookup table function 520 containing one or more power curves for the engine. An example of a generic power or torque curve for an engine is shown in FIG. 6. The graph of FIG. 6 is a graphical representation of a two-dimensional array of values that resides within the controller, and that is populated with values while the engine is "calibrated" or when the engine is still in its development stage. The graph includes a horizontal axis 602 representing a range of engine RPM values, and a vertical axis 604 representing a range of torque values. In the graph shown, the torque values of the vertical axis 604 correspond to torque outputs of the engine during operation. While the engine operates at a given RPM value there are numerous torque values that, for a compression ignition engine, correspond to varied fueling amounts injected into the engine. There is a maximum torque value for each RPM value that the engine is capable of operating, and the collection of all the maximum torque values is typically represented by a "lug" line or power curve 606. In the graph of FIG. 6 it can be seen that the power curve 606 is segmented into three portions, a low range portion 608, a mid-range portion 610, and a high range portion 612.

Every engine has a range of operation in which it operates most efficiently. In the exemplary representation of FIG. 6, the engine will operate most efficiently during operation along the mid-range portion 610 of the power curve 606. Operation of the engine above or below the mid-range 610 will be less efficient for fuel consumption purposes. Values of RPM and torque selected along the power curve operating as conditions are advantageous to the fuel economy of the engine.

Returning to the block diagram of FIG. 5, the load factor at node 510 and RPM desired value at node 518 may be input to the engine operating function 520 and used to select a set of RPM and torque conditions for operating the engine that is both sufficient to achieve a power output of the engine that meets the demands of the hydraulic system, as well as appropriate to operate the engine in an efficient manner. Hence, an eighth node 522 may carry an RPM command or output from the lookup function 520, and a ninth node 524 may carry a torque or fueling command. The commands or outputs of the eighth and ninth nodes 522 and 524 may be relayed through other portions of the ECM 320, as operating commands for the engine.

Figure 7:
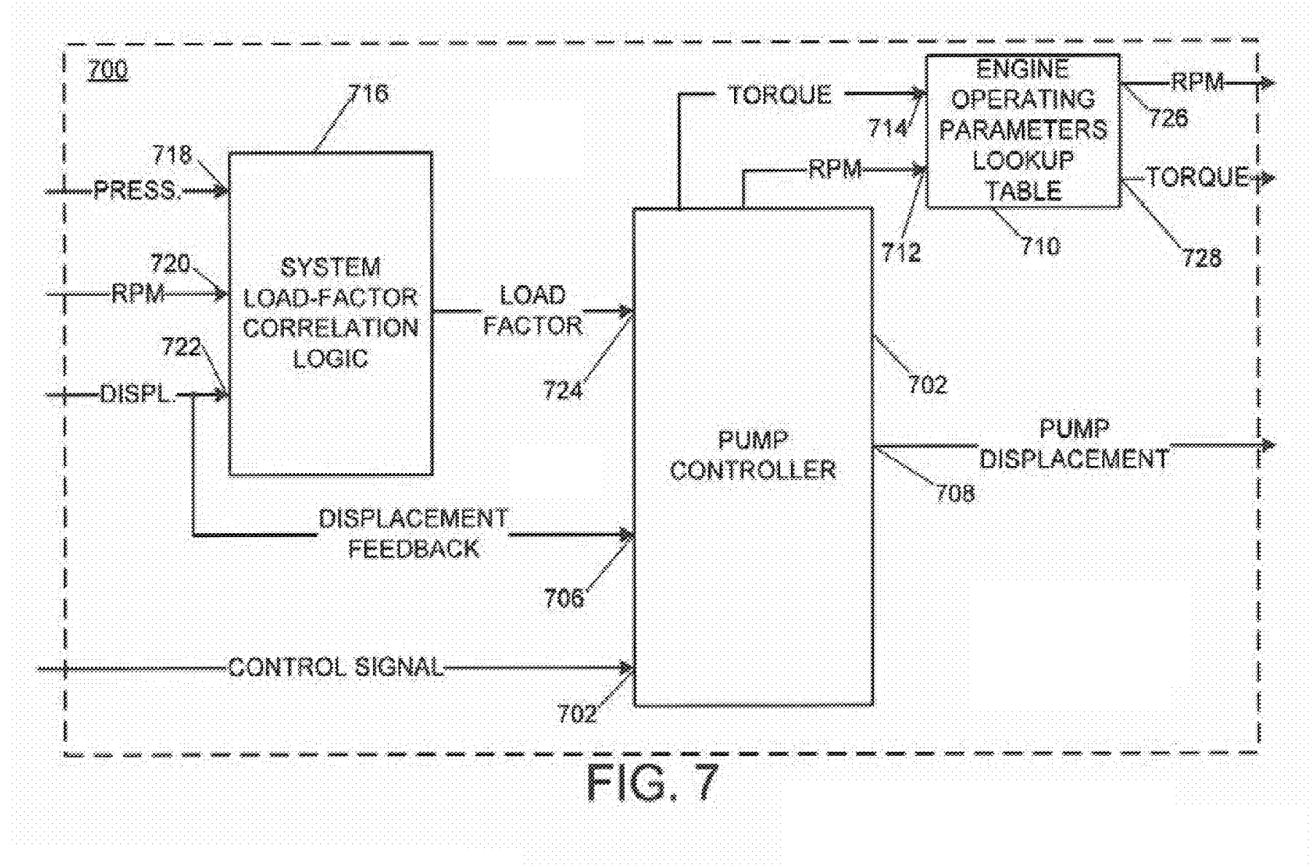
FIG. 7 is a functional diagram of at least a portion of the logic included in the electronic control module of the second embodiment.

A functional diagram for at least a portion of the logic 700 included in the ECM 420, which was described in the context of the second embodiment of FIG. 4, is shown in FIG. 7. As can be appreciated, the control scheme in this embodiment is simplified when compared to the logic system 500 shown in FIG. 5 because the displacement of the pump system is controlled electronically. Here, a pump controller 702 receives a control signal from the control sensor connected to the control lever. The control signal enters the pump controller 702 through a first node 704. A feedback value from the displacement sensor connected to the pump system enters the controller 702 through a second node 706. As can be appreciated, the controller 702 can compare the desired displacement with the actual displacement and issue a corrective displacement command through a third node 708 that will adjust the displacement of the pump as required. Advantageously, the controller 702 can adjust other parameters in addition to the pump displacement based on the control signal.

As previously described, a lookup function 710 containing one or more power curves for the engine can receive RPM and torque values from the pump controller that have been preselected to ensure optimal operation of the hydraulic system and the engine. The RPM value is looked up within the pump controller 702 and is transferred to the lookup function 710 through a fourth node 712, while the optimized torque value is transferred to the lookup function 710 through a fifth node 714. As described before, pressure, RPM, and displacement values can enter a load-factor correlation function 716 through respective nodes 718, 720, and 722, to yield a load-factor value at a sixth node 724 that is input to the pump controller 702. Based on the foregoing, the engine lookup function 710 can output a RPM and torque command to the engine through nodes 726 and 728 respectively, which along with the displacement command at the third node 708, can cause the vehicle to operate in an efficient and economical manner.

INDUSTRIAL APPLICABILITY

The present disclosure is applicable to vehicles having hydraulic systems including one or more variable displacement pump(s), one or more hydrostatic propel motor(s), and an engine associated with the hydraulic system, the engine operating to drive the pump(s). A control lever can mechanically or electronically convey a command for a vehicle speed from an operator. The hydraulic system can then control the various components of the system to achieve and maintain the desired speed, but advantageously, can also optimize the operation of the system and/or the engine to achieve a more economical operational state.

A hydraulic system in accordance with the disclosure includes an electronic controller arranged to receive feedback from fluid pressure sensors disposed in the propel circuit or circuits. This pressure is used by the controller as an indication of load on the propel circuit. When the pressure is low, an energy input by the engine to the hydraulic system is adequate to meet the demands of the system with little or no energy wasted. Conversely, when the pressure increases, the controller infers that the energy being input to the system is greater than the energy the system demands. In such situations, the system is capable of adjusting the energy input to the system by reducing the power output of the engine, and/or adjusting the displacement of the pump or the propel motors within the system to reduce the waste of energy and improve overall system efficiency and fuel consumption.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A control system for use with a hydrostatically driven vehicle operably associated with a variable displacement pump, the variable displacement pump connected to at least one hydraulic propel motor and generating a controllable flow of motive fluid therethrough that propels the vehicle at a travel speed, the variable displacement pump connected to the hydraulic propel motor via a fluid transfer line and to an engine via a transmission, the engine being responsive to a fueling command from an electronic control module, the control system comprising:

a control connected to the variable displacement pump and operative to set a desired flow rate of the flow of motive fluid;

a displacement sensor connected to the variable displacement pump and arranged to sense a displacement setting of the variable displacement pump;

a pressure sensor arranged to sense a pressure of the motive fluid in the fluid transfer line;

the electronic control module being configured to:
      receive the desired flow rate of the flow of motive fluid;
      receive the displacement setting from the displacement sensor;
      receive the pressure of motive fluid in the fluid transfer line;
      determine a pump load factor based on the displacement setting and the pressure;
      calculate engine operating parameters based on an interpolation of the pump load factor and the desired flow rate against a map of engine operating parameters; and
      change at least one of the fueling command of the engine, the displacement setting of the pump, and a displacement setting of the propel motor based on the calculated engine operating parameters while the travel speed is maintained substantially constant.

2. The control system of claim 1, further including an actuator associated with the at least one hydraulic propel motor, the actuator connected to the electronic control module, the electronic control module further disposed to change the displacement setting of the propel motor based on the pressure of motive fluid.

3. The control system of claim 1, wherein the map of engine operating parameters includes a two dimensional array of engine speed versus engine torque values.

4. The control system of claim 1, further including a sensor connected to the at least one hydraulic propel motor, the sensor arranged to sense and relay a value to the electronic control module that is indicative of a displacement position of the at least one hydraulic propel motor.

5. The control system of claim 1, further including a control sensor associated with the control, the control sensor arranged to sense and relay a value to the electronic control module that is indicative of a position of the control.

6. The control system of claim 1, further including an actuator associated with the variable displacement pump, the actuator operating to change the displacement setting of the variable displacement pump, the actuator operatively connected to the electronic control module.

* * * * *